United States Patent [19]

Aizawa et al.

[11] Patent Number: 4,940,564
[45] Date of Patent: Jul. 10, 1990

[54] SUPPRESSION OF DEPOSITION OF RADIOACTIVE SUBSTANCES IN BOILING WATER TYPE, NUCLEAR POWER PLANT

[75] Inventors: Motohiro Aizawa; Katsumi Ohsumi, both of Hitachi; Takashi Honda, Katsuta; Hisao Itow, Hitachi, all of Japan

[73] Assignees: Hitachi, Ltd., Tokyo; Hitachi Engineering Co., Ltd., Ibaraki, both of Japan

[21] Appl. No.: 110,454

[22] Filed: Oct. 20, 1987

[30] Foreign Application Priority Data

Oct. 20, 1986 [JP] Japan .................. 61-249168

[51] Int. Cl.$^5$ .............................................. G21C 19/28
[52] U.S. Cl. .................................................. 376/306
[58] Field of Search ............... 376/306, 305; 427/5, 427/6; 148/6.14 R, 6.14 A

[56] References Cited

U.S. PATENT DOCUMENTS

| | | | |
|---|---|---|---|
| 4,045,253 | 8/1977 | Banks et al. | 252/394 |
| 4,364,900 | 12/1982 | Burrill | 376/306 |
| 4,376,753 | 3/1983 | Lucas | 376/305 |
| 4,476,047 | 10/1984 | Bonnici et al. | 376/306 |
| 4,526,626 | 7/1985 | Carter | 376/306 |
| 4,722,823 | 2/1988 | Honda et al. | 376/306 |
| 4,759,900 | 7/1988 | Peterson et al. | 376/306 |
| 4,764,338 | 8/1988 | Uchida et al. | 376/313 |
| 4,820,473 | 4/1989 | Ohashi et al. | 376/305 |

FOREIGN PATENT DOCUMENTS

| | | | |
|---|---|---|---|
| 2824290 | 12/1978 | Fed. Rep. of Germany | 376/306 |
| 0065298 | 5/1979 | Japan | 376/306 |
| 0151394 | 11/1981 | Japan | 376/305 |
| 0054897 | 4/1982 | Japan | 376/306 |
| 0012390 | 1/1984 | Japan | . |
| 0098390 | 6/1985 | Japan | 376/306 |
| 2177492 | 8/1987 | Japan | 376/306 |

Primary Examiner—Daniel D. Wasil
Attorney, Agent, or Firm—Antonelli, Terry, Stout & Kraus

[57] ABSTRACT

In a boiling water-type, nuclear power plant, deposition of radioactive substances on the surfaces of out-of-core components in the primary cooling water system in the nuclear power plant is suppressed by injecting an alkaline element into reactor water in the presence of more than an amount of the oxygen formed by nuclear fission of the reactor water and dissolved in the reactor water, particularly without hydrogen gas injection, during the nuclear heatup operation period of a boiling water type, nuclear power plant and circulating the injected alkaline element through the primary cooling water system of a nuclear reactor, thereby forming an oxide film on the surfaces of out-of-core components in the primary cooling water system of the nuclear reactor. Exposure of plant personnel to radioactivity can be reduced thereby. The present boiling water-type, nuclear power plant is provided with a means for forming such oxide film.

6 Claims, 8 Drawing Sheets

SUPPRESSION OF DEPOSITION OF RADIOACTIVE SUBSTANCES IN BOILING WATER TYPE, NUCLEAR POWER PLANT

BACKGROUND OF THE INVENTION

This invention relates to a method for reducing the accumulation of radioactive substances on the piping inside surfaces of primary cooling water system in contact with reactor water in a newly constructed nuclear power plant and provides a reactor water pH control system suitable for adjusting the pH of reactor water to a slightly alkaline side when an oxide film having a high effect on suppressing deposition of radioactive substances is to be formed. Pipings, pumps, valves, etc. used in the primary cooling water system in nuclear power plants are made of stainless steel, carbon steel, sterite, etc., which will be hereinafter referred to as "out-of-core components". These metals as component materials start to undergo corrosion little by little from the time of start-up of the plant operation, and the constituent metal elements dissolve into the primary cooling water. In a boiling water type, nuclear power plant these corrosion products are removed in a condensate water purification unit, but the corrosion products that cannot be removed in the purification unit and other corrosion products formed in the feedwater system after the condensate water purification unit accumulate in the reactor of the plant.

Most of the corrosion products brought into the reactor turn into oxides, deposit onto fuel rods and are subjected to neutron irradiation. As a result, radioactive nuclides such as $^{60}Co$, $^{58}Co$, $^{51}Cr$, $^{54}Mn$, etc. are formed. These radioactive nuclides are redissolved into the reactor water and turn into ions or suspended as insoluble solids, which will be hereinafter referred to as crud. A portion of the ions and crud are removed in a purification unit of a reactor water clean-up system for purifying reactor water; whereas the remainder circulates through the primary cooling water system of reactor and deposits onto the surfaces of out-of-core components. Thus, the dose rate increases on the surfaces of out-of-core components and radiation exposure of plant personnel during the periodic inspection time is a problem.

In order to reduce the amount of deposited radioactive substances, methods for suppressing formation of the corrosion products as a source have been proposed, wherein corrosion of component material is suppressed, for example, by using corrosion-resistant materials or by injecting oxygen into the feed water. However, the corrosion of the component material in the feed water system cannot be thoroughly suppressed even according to these methods, and the concentration of radioactive substances in reactor water is not thoroughly reduced. Thus, the increase in the dose rate due to the deposition of radioactive substances onto the surfaces of the out-of-core components still remains as a problem.

In order to solve the problem, methods for removing the radioactive substances deposited on the surfaces of the out-of-core components have been proposed. According to one method for removing the radioactive substances from the surfaces of the out-of-core components in complicated structures in the reactor system, oxide films formed on the surfaces of the out-of-core components are dissolved with a chemical to remove the radioactive substances contained in the films. The method still has such problems that, even though the dose rate can be reduced tentatively, the out-of-core component materials will be again exposed to reactor water containing radioactive substances at a high concentration when the operation of the plant is restarted, and a new oxide film will be formed again thereby to undergo rapid recontamination.

To overcome the problems, methods for forming an oxide film before the startup of a plant or at the initial period of plant operation, where there are no radioactive substances or the concentrations of radioactive substances are very low in the reactor water, thereby suppressing the deposition of radioactive substances, are disclosed in Japanese Patent Applications Kokai (Laid-open) Nos. 59-12390 and 59-37498. The disclosure is summarized as follows.

Radioactive nuclides dissolved in reactor water are taken into the oxide film formed on the surface of stainless steel as out-of-core component by corrosion of the stainless steel in the course of its formation. In high temperature water, the oxide film grows mainly inwardly (toward the matrix metal side) at the boundary surface between the film and the matrix metal, and the radioactive nuclides are diffused and migrate inwardly through the film and taken into the thus formed oxide film at the same boundary surface. Thus, in order to suppress the deposition of radioactive substances, diffusion of the radioactive substances through the oxide film must be suppressed. Furthermore, the deposition rate of radioactive substances has been found to be in a correlation with the film growth rate, and thus the suppression of film growth leads to the reduction in the deposition of radioactive substances. That is, the correlation of the deposition rate of radioactive substances to the film growth rate is given by taking the radioactive substances into the oxide film at the film growth points. Thus, the suppression of film growth can correspondingly reduce the frequency of taking the radioactive substances into the film. That is, it is suppressed to take the radioactive substances into the film.

Increase in the film growth (m) on the stainless steel in reactor water is in a logarithmic relation to time (t) as given by the following equation (1):

$$m = K_1 \log (K_2 t + 1) \tag{1}$$

where $K_1$ and $K_2$ are constants.

That is, the film growth rate decreases with increasing film growth with time. Thus, if a non-radioactive film is formed in advance on the stainless steel, the quantity of film to be newly formed can be reduced, and the quantity of radioactive substances to be taken into the newly formed oxide film can be suppressed. In other words, the treatment for suppressing the oxide film formation is nothing but a treatment for suppressing the corrosion of out-of-core components and also serves to reduce the quantity of soluble components from the core component materials. Thus, the treatment for forming an oxide film in a non-radioactive circumstance in advance can reduce the quantity of radioactive substances to be dissolved from the core component materials which are to be directly radioactivated in the reactor water, and can also contribute to the reduction in the concentration of radioactive substances in the reactor water.

However, the deposition behavior of radioactive substances considerably depends upon the properties of an oxide film to be formed in advance. For example, the behavior of radioactive ions depends upon the electrically charged state of an oxide film formed in advance. Furthermore, the growth rate of an oxide film to be newly formed on the surfaces of the out-of-core components after the out-of-core components are brought in contact with reactor water containing the radioactive substances depends upon the properties of the existing oxide film. Thus, it is necessary to conduct the oxidation treatment of out-of-core components according to the most appropriate method under conditions of reactor water circumstance. Furthermore in an actual plant it is necessary to conduct the oxidation treatment within the restriction of water quality control standard and operating control standard without impairing the plant. To this end, it is necessary to make appropriate selection of the time for conducting the oxidation treatment and the method for alkali injection from the plant construction period and the startup test period and also to make appropriate selection of plant operating procedure at the oxidation treatment.

SUMMARY OF THE INVENTION

An object of the present invention is to provide a nuclear power plant with a lower radioactivity where the amount of radioactive substances to be deposited onto the surfaces of the out-of-core components of the nuclear power plant in contact with the cooling water containing the radioactive substances and the amount of corrosion products to be dissolved from the core component materials are suppressed.

Another object of the present invention is to provide a method for suppressing deposition of radioactive substances onto the surfaces of the out-of-core components in the primary cooling water system of a nuclear power plant.

Further objects of the present invention are to provide a system structure of a nuclear power plant to which the said method of the present invention is applied, and a method for operating the nuclear power plant.

The present method for suppressing deposition of radioactive substances onto the surfaces of out-of-core components in a boiling water-type, nuclear power plant is characterized by injecting an alkaline element into reactor water in the presence of an amount of the oxygen formed by nuclear fission of the reactor water and dissolved in the reactor water, particularly without hydrogen gas injection, during the nuclear heatup operation period of a boiling water type, nuclear power plant and circulating the reactor water containing the injected alkaline element through the primary cooling water system of a nuclear reactor, thereby forming an oxide film on the surfaces of out-of-core components in the primary cooling water system of the nuclear power plant.

The present boiling water-type, nuclear power plant is characterized by comprising a nuclear reactor, a turbine, a condenser, a condensate prefilter, a condensate demineralizer, a feedwater heater, a nuclear reactor recirculation system and a reactor water cleanup system provided with a unit for injecting an alkaline element as main components.

DETAILED DESCRIPTION OF THE INVENTION

The present method for suppressing deposition of radioactive substances onto the surfaces of the out-of-core components in the primary cooling system in a nuclear power plant, which the present inventors have found, will be described in detail below, referring to the accompanying drawings.

It is known that, once the pretreatment to form an oxide film is carried out in a circumstance containing no radioactive substances, new film growth can be suppressed in reactor water containing radioactive substances by the presence of the oxide film formed by the pretreatment, even if exposed to the reactor water containing the radioactive substances, and consequently deposition of radioactive substances can be also suppressed, as described before. The effect on the suppressing deposition of radioactive substances greatly depends on the characteristics of the film formed by the pretreatment.

Figure 2:
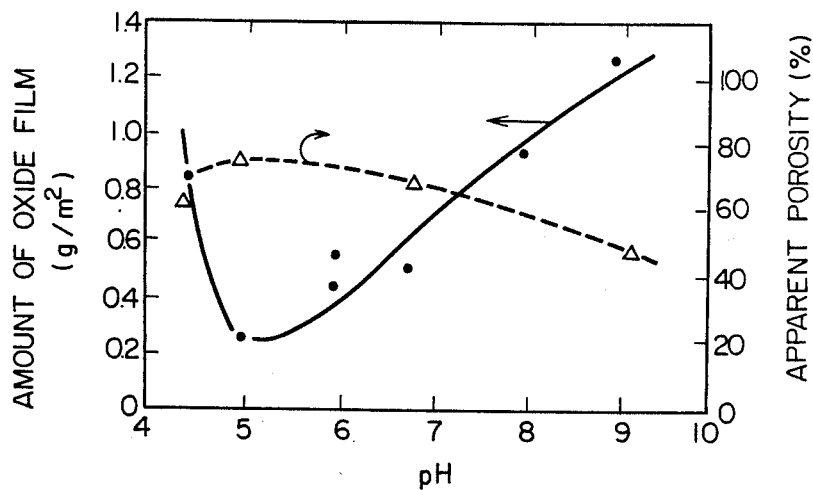
FIG. 2 is a diagram showing characteristics of oxide films formed in slightly alkaline water.

The present inventors have found that a dense film with a low apparent porosity and a large layer thickness can be formed on the surfaces of out-of-core components by adjusting pH of reactor water at the pretreatment to a slightly alkaline side, as shown in FIG. 2. The film formed by the pretreatment can serve as a barrier against diffusion of the dissolved oxygen in the reactor water toward the surfaces of out-of-core components and also as a barrier against diffusion of corrosion products released from the matrix metal by corrosion into the reactor water. It seems that the pretreatment can effectively suppress formation of further oxide film in the reactor water circumstance.

Furthermore, the present inventors have confirmed this effect on suppressing the deposition of radioactive substances in a simulated reactor water circumstance containing radioactive substances. The results are shown in FIG. 3, where reactor water circumstance conditions in a boiling water type, nuclear power plant are:

Temperature: 280° C.
Dissolved oxygen concentration: 200 ppb±100 ppb

Figure 3:
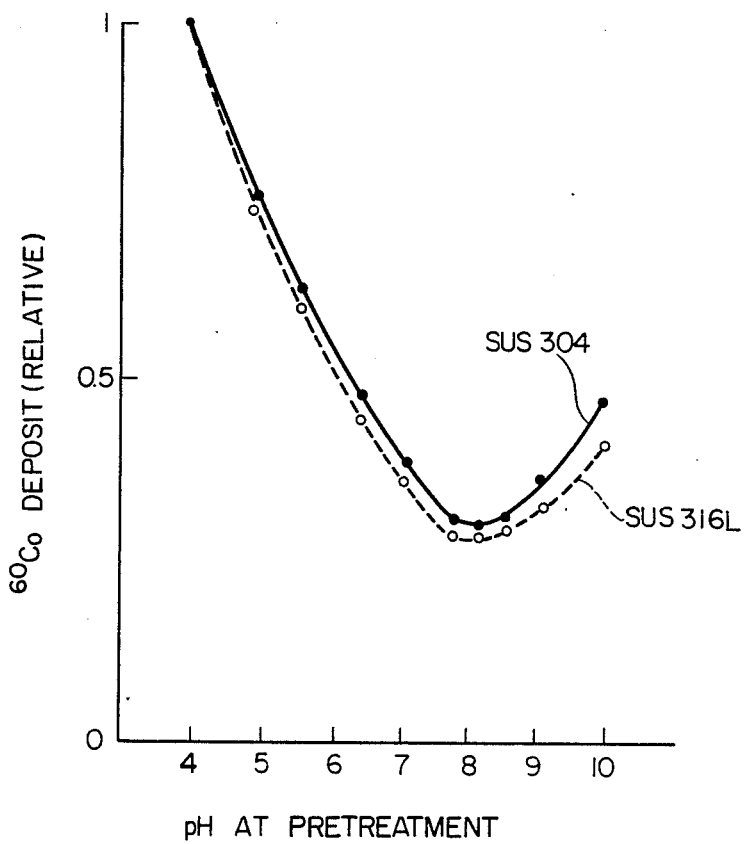
FIG. 3 is a diagram showing effects of pH of water at the pretreatment on suppressing deposition of radioactive substances.

It can be seen from FIG. 3 that a preferable pH range for the least deposition of the radioactive substances is 7.8 to 8.6.

Figure 4:
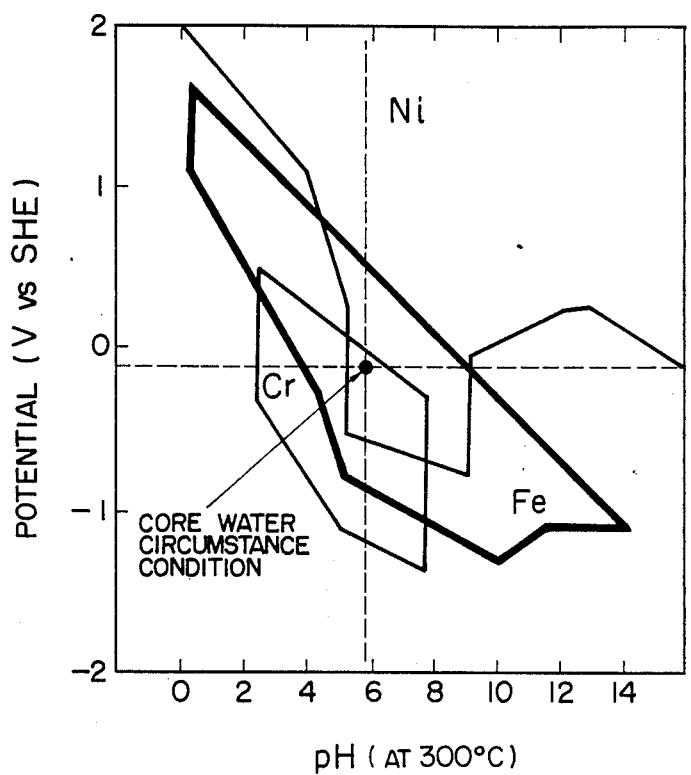
FIG. 4 is a diagram showing a relationship between the potential and the pH at the pretreatment for the out-of-core components.

The reasons why the oxygen concentration of 200±100 ppb and the pH of 7.8 to 8.6 are preferable, as shown in FIG. 3, seem to be due to the stabilities of the oxides of constituent elements of component materials on the basis of a relationship between the potential and the pH, as shown in FIG. 4.

FIG. 4 shows stable regions of oxides of Fe, Ni and Cr at 300° C. on the basis of a relationship between the potential and the pH, where the dissolved oxygen concentration in the reactor water gives an influence upon the potential changes. At a higher dissolved oxygen concentration, the potential shifts toward a nobler side, whereas at a lower dissolved oxygen concentration the potential shifts toward a baser side. For example, the potential of stainless steel in degasified water is less than −0.5 (V vs SHE). In high temperature water containing dissolved oxygen, Cr in the matrix stainless steel exists at the boundary of stable oxide region at a higher pH, as shown in FIG. 4 and dissolves as chromate ions. Thus, Fe and Ni are stabilized as oxides, reducing their solubilities. As a result, the entire surfaces of the component materials are covered by dense oxide films composed mainly of oxides of Fe and Ni, producing a distinguished effect on suppressing the deposition of radioactive substances.

In the reactor water circumstance of a boiling water type, nuclear reactor during the period of rated operation, there prevails an oxidative circumstance usually containing about 200 ppb of dissolved oxygen, where Cr is readily dissolvable. When an oxide film rich in Cr is formed by the oxidation treatment in a degasified reactor water circumstance at an ultra-low dissolved oxygen concentration, and the oxide film is exposed to the reactor water circumstance for a long time during the period of rated operation of a boiling water type, nuclear reactor, Cr is redissolved from the oxide film as chromate ions, increasing the film defects and deteriorating the protective property of the oxide film.

Under the said slightly alkaline pretreatment condition of the present invention, an oxide film composed mainly of oxides of Fe and Ni and containing less Cr oxide is formed, and thus can exist stably over a long period of time in the reactor water circumstance of the boiling water type, nuclear reactor, producing a good protective action and a distinguished effect on suppressing the deposition of radioactive substances.

When an oxide film is formed in water while subjecting the reactor water to a degasifying operation or both degasifying operation and hydrogen injection, that is, at an ultra-low dissolved oxygen concentration, such a circumstance will prevails that Ni will exist in the dissolvable region, and thus the resulting oxide film composed mainly of oxides of Cr and Fe is obtained. Thus, when the thus obtained oxide film is exposed to the reactor water circumstance of a boiling water type, nuclear reactor for a long period of time, Cr will be dissolved from the oxide film, unpreferably increasing film defects and deteriorating the protective property of the oxide film.

In application to an actual atomic power plant, the pH is preferably 8.0 to 8.6.

In application to an actual nuclear power plant of the present pretreatment to form an oxide film on the surfaces of the out-of-core components in slightly alkaline water, it is necessary to take into account the water quality control standard, the operation control standard, etc. based on the system structure and plant design condition of an actual plant while maintaining a plant soundness, and to employ an economically cheap method.

Under these circumstances, the present inventors have optimized the reactor water pH control mechanism, while taking the foregoing points fully into consideration.

Time for conducting the pretreatment to form an oxide film on the surfaces of the out-of-core components in contact with reactor water is most rationally that right after the completion of a plant construction at which the entire area of the out-of-core components can be pretreated at the same time. A heat source is required for the formation of the oxide film. After the completion of the plant construction, nuclear fuel is charged in the reactor core, so that the reactor water can be heated by the heat of burning of the nuclear fuel. Thus, it is desirable from this point of view to conduct the pretreatment after the completion of the plant construction. The time for carrying out the pretreatment after the charging of nuclear fuel is most desirably an initial period at a very low concentration of radioactive substances in reactor water, i.e. the so called nuclear heatup operation period, where the reactor water reaches a temperature of 100° C. or higher for the first time, and thus an oxide film can be formed on the surfaces of out-of-core components also for the first time. In this period, the concentration of radioactive substances in the reactor water is very low, for example, less than 1/100 of the concentration during the normal operation owing to the initial period of fuel burning. Thus, formation of an oxide film having a good effect on suppressing the deposition of radioactive substances can be made by conducting nuclear heatup operation while adjusting the reactor water to a slightly alkaline side during the initial period, as shown in FIG. 3.

Plant operating state during the nuclear heatup operation period will be described below, referring to FIG. 5.

Figure 5:
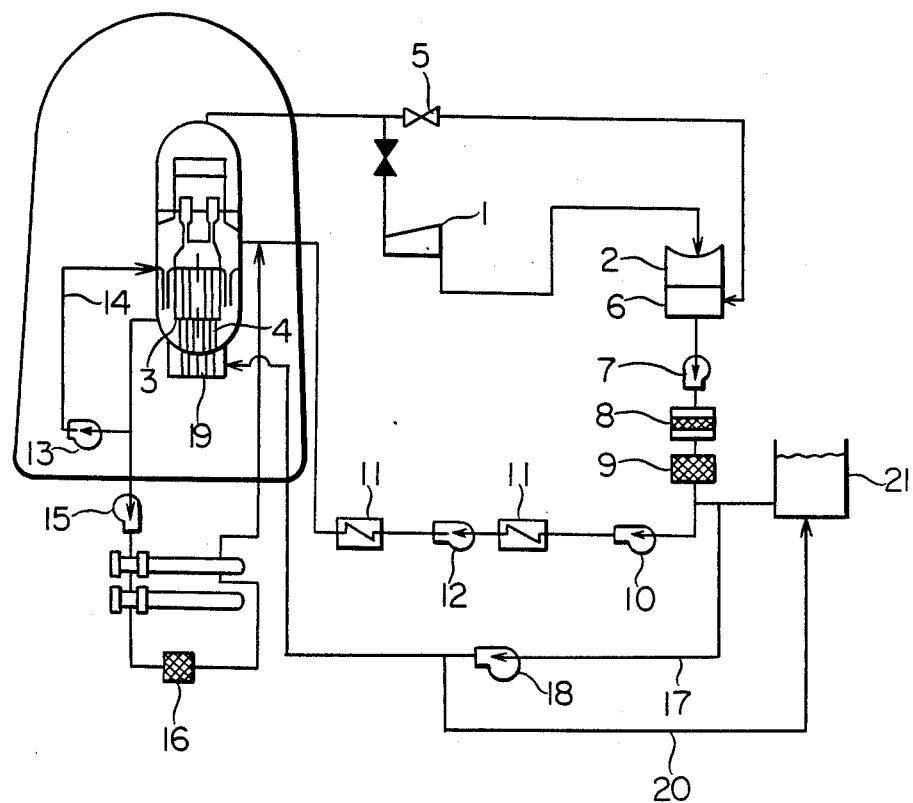
FIG. 5 is a flow diagram showing a nuclear heatup operation state of a nuclear power plant.

In FIG. 5, nuclear heatup operation is carried out with a low power output of less than 20% by by-passing turbines 1 and 2 to inspect the operating states of the respective systems and units.

The nuclear heatup test is carried out by withdrawing control rods 4 inserted in a fuel assembly 3 to increase the degree of burnup of fuel rods and increase the temperature and pressure of reactor water. When generated steam reaches 70 kg/cm$^2$, a rated pressure, a main steam isolation bypass valve 5 is opened to lead the generated steam to a condenser 6, thereby condensing the steam. The resulting condensate water is led to a condensate prefilter 8 and a condensate demineralizer 9 through a condensate pump 7 to remove the impurities from the condensate water. Then, the condensate water is led to a feedwater system by a condensate water pressurizing pump 10. The feedwater system forms a recycle loop for returning the condensate water as reactor water through feedwater heaters 11 and a feedwater pump 12. On the other hand, the reactor water that has reached 280° C. and 70 atmospheres is circulated through a recycle piping 14 by a recycle pump 13, and a portion of the recycled reactor water is led to a filter 16 of reactor water cleanup system by a pump 15 of reactor water cleanup system to remove the impurities from the reactor water. The purified reactor water is returned to the feedwater system and again into the reactor.

A portion of the condensate water from the condensate demineralizer 9 is pressurized by a control rod driving water (CRD) pump 18 in a spillover line 17 and led to the reactor through a control driving unit 19. Furthermore, another portion of the condensate water from the CRD pump 18 is returned to a condensate storage tank 21 through a minimum flow line 20.

In the nuclear heatup operation state of a boiling water type, nuclear power plant as described above, it is necessary to inject alkaline elements into the reactor from the outside to adjust the pH of the reactor water to 7.8-8.6, preferably 8.0-8.6. Alkaline elements can be provided in the reactor water according to the following two procedures. According to one procedure, alkaline elements are injected into a cooling water system which allows the cooling water to flow into the reactor (i.e. feedwater-condensate water system, control rod driving water system, and reactor water cleanup system. According to another procedure, an alkaline element is loaded on the resin in the condensate demineralizer or on the filter resin in the reactor water cleanup system in advance, and the loaded alkaline elements are released into the cooling water by virtue of the distribution equilibrium with hydrogen ions (H+) in the cooling water, thereby injecting the alkaline elements into the nuclear reactor through the cooling water.

The present inventors have found that, among these two procedures, the latter procedure for loading alkaline elements on the ion exchange resin can assure most ready operation, when applied to the filter 16 in the reactor water cleanup (RWCU) system.

If the latter procedure is not employed, a portion of alkaline elements injected into the cooling water system of the nuclear power plant according to the former procedure will be trapped on the ion exchange resin in the RWCU filter 16, and thus it will be necessary to inject the alkaline elements continuously into the cooling water system throughout the period of adjusting the pH of reactor water. That is, it will be necessary to conduct continuous control of injecting the alkaline elements. On the other hand, when the alkaline elements are loaded on the resins of RWCU filter, and even if the alkaline elements once released into the reactor water and returned to the RWCU filter, the already released alkali elements can pass through the RWCU filter without their removal by the ion exchange resins in the RWCU filter. Thus, once the pH of the reactor water is set to a desired value, stable and continuous operation can be assured over a long period of time, and thus a large operating merit can be obtained.

The latter procedure utilizes the characteristics of distribution equilibrium between the alkaline element concentration and the hydrogen ion concentration in the ion exchange resin and the water, shown by the following equation (2):

$$K_H^M = \frac{[R-M]}{[R-H]} \cdot \frac{[H^+]}{[M^+]} \qquad (2)$$

wherein:
[R−M]: alkaline element concentration in the resin
[R−H]: Hydrogen ion concentration in the resin
[H+]: Hydrogen ion concentration in the cooling water
[M+]: Alkaline ion concentration in the cooling water
$K_H^M$: Selection coefficient The selection coefficient $K_H^M$ in the equation (2) depends upon the species of alkaline elements. In pure water at 25° C., it is known that sodium has $K_H^{Na}=1.56^*$, potassium has $K_H^K=2.28^*$ and lithium has $K_H^L=0.97$ [O. D. Bonner, L. Smith: J. Phys. Chem. 61 326 (1957)].

An alkaline element concentration in the cooling water, set by releasing an alkaline element from the ion exchange resin, is substituted for the [M+]concentration, and a hydrogen ion concentration in the cooling water, set by releasing the alkaline element into the cooling water, is substituted for the [H+] concentration. A value of [R−M]/[R−H] in the equation (2) can be set thereby. By changing the ratio of [R−M]/[R−H], it is possible to adjust the alkaline element concentration at the outlet of the RWCU filter 16.

By substituting an alkaline element concentration in the cooling water and a hydrogen ion concentration ($1.0 \times 10^{-6} - 2.5 \times 10^{-9}$ mol/l in case of pH=8.0−8.6) in the cooling water at the place, where the alkaline element is returned to the RWCU filter 16, for the [M+] concentration and the [H+] concentration in the equation (2), respectively, as desired, adjusted concentrations in the reactor water, as in case of loading the alkaline element on the resins of RWCU filter, on the other band, a value of [R−M]/[R−H], ratio of alkaline element to be loaded on the ion exchange resins, can be obtained.

According to the foregoing latter procedure, it is possible to control the pH of reactor water to a desired valve. The concentration of the alkaline ions released from the ion exchange resins is very low, for example, $1 \times 10^{-6} - 4.0 \times 10^{-6}$ mol/l, and thus there is a possibility that the pH of reactor water will slightly change by the presence of very small amounts of impurities contained in the reactor water, and the alkaline ions in the reactor water will be discharged to the outside of the system by reactor water level-adjusting operation (reactor water blow) due to fluctuations in the power output during the period of nuclear heatup test. Thus, it is necessary to intermittently supply alkaline elements to the system during the period of pretreatment to form the oxide film.

The alkaline elements can be supplied to the system according to the following four routes.
(1) By injection of alkaline elements into the reactor water cleanup (RWCU) system,
(2) By injection of alkaline elements into the control rod driving water (CRD) system,
(3) By injection of alkaline elements into the feedwater-condensate water system, and
(4) By injection of alkaline elements into the primary loop recirculation (PLR) system.

The routes (1), (3) and (4) can perform the alkaline element injection only by providing an injection unit and an injection point that can meet the design conditions of the injection system, whereas the route (2) for injecting the alkaline elements into the CRD system requires a recovery system for pump minimum flow return water, because, as shown in FIG. 5, a portion of the water from the CRD pump 18 is returned to the condensate storage tank 21 through the pump minimum flow line 20 as return water, and thus the condensate storage tank 21 has a possibility of contamination with the alkaline elements.

PREFERRED EMBODIMENTS OF THE INVENTION

The present invention will be described in detail below, referring to embodiments.

EXAMPLE

Figure 1:
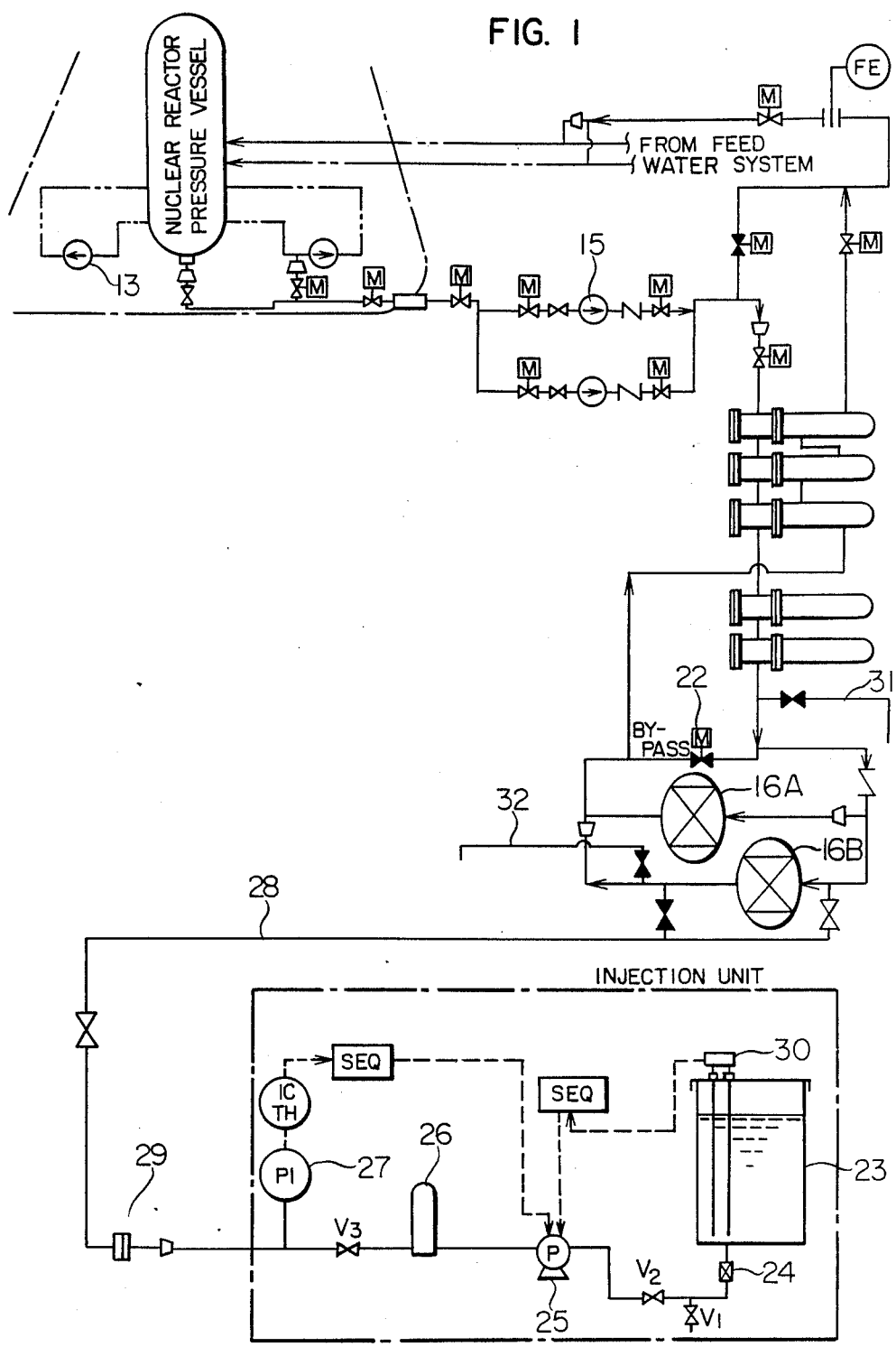
FIG. 1 is a flow diagram showing a method for injecting an alkaline element by loading an alkaline element on a filter of reactor water cleanup (RWCU) system in a nuclear power plant according to one embodiment of the present invention.

In FIG. 1, one embodiment of most practical reactor water pH control mechanism according to the present invention is shown. That is, the embodiment shown in FIG. 1 relates to a system for loading alkaline elements on the cation exchange resin in the mixed resins as a filter medium in the RWCU filter, a method for injecting alkaline elements to adjust the pH of reactor water to a desired value with a high exactness, and a method for operating a nuclear power plant.

According to the operating procedure, control rods are withdrawn from the fuel assembly after charging the fuel rods into the core, thereby burning the nuclear fuel and elevating the temperature of reactor water. Before the temperature of reactor water reaches 100° C., one of RWCU filters 16 is precoated with ion exchange resins containing cation exchange resin loaded with alkaline elements and is put on stand-by. In this embodiment, a filter 16B is precoated with the ion exchange resins containing cation exchange resin loaded with Na as the alkaline elements. The filter 16B is ready for use when the precoating of the filter 16B with ion exchange resins containing alkaline element-loaded cation exchange resin is completed, whereas the other filter 16A which has been precoated with regenerated ion exchange resins is used to purify the reactor water.

When the temperature of reactor water exceeds 100° C., reactor water is passed through the filter 16B to release the alkaline ions from the loaded cation exchange resin. After the operation to pass the reactor water through the filter 16B to inject the alkaline ions into the reactor water has been started, the flow rate through the filter 16A is slowly turned down and finally the passage of the reactor water through the filter 16A is discontinued and the filter 16A is put on stand-by. At the same time, a bypass valve 22 in the RWCW system is opened to ensure the rated flow rate through the RWCU system.

With the passage of the reactor water through the filter 16B, the concentration of alkaline ions in the reactor water is increased, and consequently the pH of the reactor water is increased. When the controlled pH of the reactor water is found to exceed its upper limit, i.e. 8.6 in this case, the reactor water is passed through the filter 16A, which has been put on stand-by, to remove the alkaline ions from the reactor water. In this manner, the pH of the reactor water is so controlled as not to exceed 8.6.

When the pH of the reactor water fails to reach the desired pH value on the other hand, the reactor water is passed again through the filter 16A, while the filter 16B is isolated from the line and precoated again with the ion exchange resins containing cation exchange resin loaded with the alkaline elements for increasing the concentration of the alkaline ions in the reactor water when the reactor water is passed therethrough again. Or, an alkaline element injection line 28 is provided at the inlet or the outlet of the filter 16B, as shown in FIG. 1, to inject the alkaline elements at a very small rate through the injection line 28. The unit for injecting alkaline elements is a system comprising a chemical preparation tank 23, a line filter 24, a chemical injection pump 25 containing an aqueous solution of the alkaline element, a damper 26, and a pressure gage 27, where the system is connected to the alkaline element injection line 28 desirably through a flange 29, as shown in FIG. 1.

The unit for injecting alkaline elements, shown in FIG. 1, is desirably provided with safety units, i.e. a unit for preventing air injection by way of a chemical preparation tank level meter 30 and a unit which is actuated by the degree of injection pressure so that the pressure indicated by the pressure gage 27 may not exceed the system pressure. Safe injection of alkaline elements can be made by switching off the power source to the chemical injection pump 25 according to a signal of lower chemical preparation tank level and a signal of higher injection pressure.

Performance to remove other impurities than the alkaline ions in the RWCU filters 16 is watched and controlled by sampling the system water through a sampling line 31 at the inlet to the filters 16 and through a sampling line 32 at the outlet from the filter 16B. When the performance to remove other impurities than the alkaline ions becomes lower than 90%, the filter 16B is again precoated with the ion exchange resins containing Na-loaded cation exchange resin, whereby the reactor water pH control operation can be made.

Figure 6:
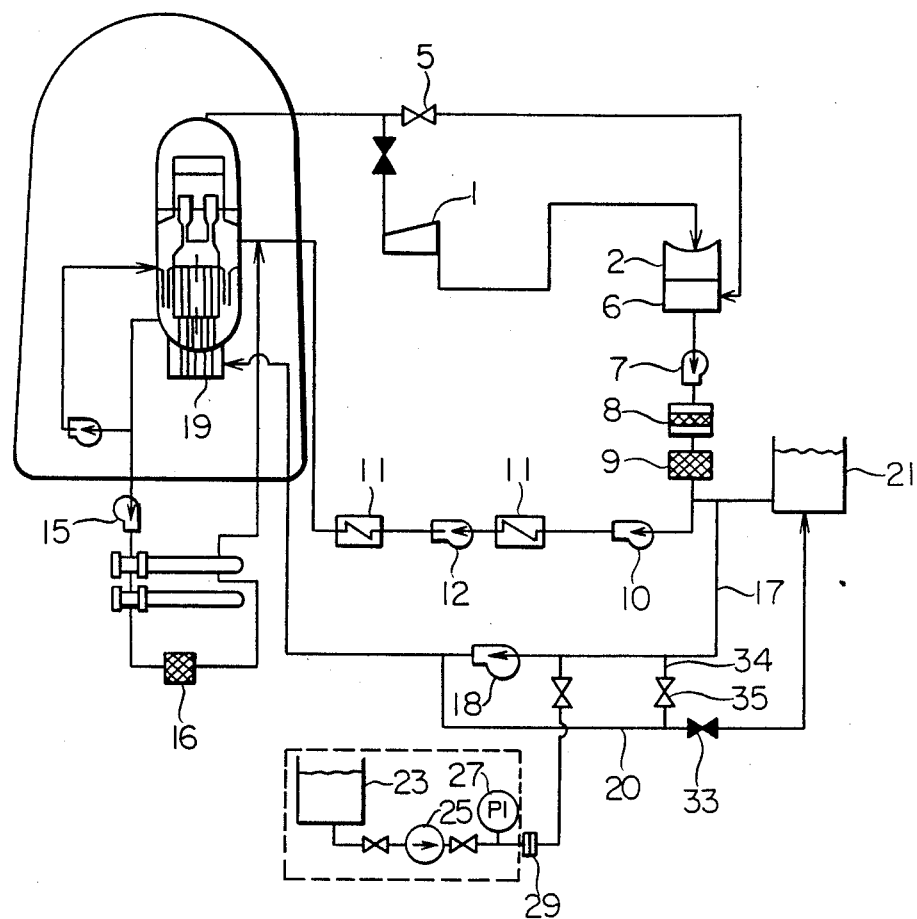
FIG. 6 is a flow diagram showing injection of alkaline elements into the control rod driving water (CRD) system of a nuclear power plant.

A second embodiment of the present invention will be shown in FIG. 6, where alkaline elements are injected into the CRD system.

An alkaline element injection point to the CRD system is desirably at the inlet to the CRD pump 18, where the system pressure is relatively low, i.e. about 14 $kg/cm^2$. The alkaline elements injected at the inlet to the CRD pump 18 enters the nuclear reactor, while some of it is led to the condensate storage tank 21 through the pump minimum flow line 20. To prevent the leading to the condensate storage tank 21, a stop valve 33 is additionally provided in the pump minimum flow line 20, a line 34 is provided between the pump minimum flow line 20 and the spillover line 17, and a stop valve 35 is provided in the line 34. By providing the line 34, followed by closing the stop valve 33 in the minimum flow line 20 and opening the stop valve 35 in the line 34, the whole amount of the injected alkaline elements can be put into the reactor water.

After establishing such a recycle loop, the alkaline elements are injected to the CRD system by the chemical injection pump 25 in the same manner as in FIG. 1.

When the RWCU filter 16B is precoated with the ion exchange resins containing alkaline element-loaded cation exchange resin, the necessary amount of the alkaline elements is intermittently injected into the CRD system in the course of operation, whereas, when the RWCU filter 16B is not precoated with the ion exchange resins containing alkaline element-loaded cation exchange resin, the alkaline elements are continuously injected into the CRD system at a rate of about 0.076 to about 0.481 mol/hr.

Figure 7:
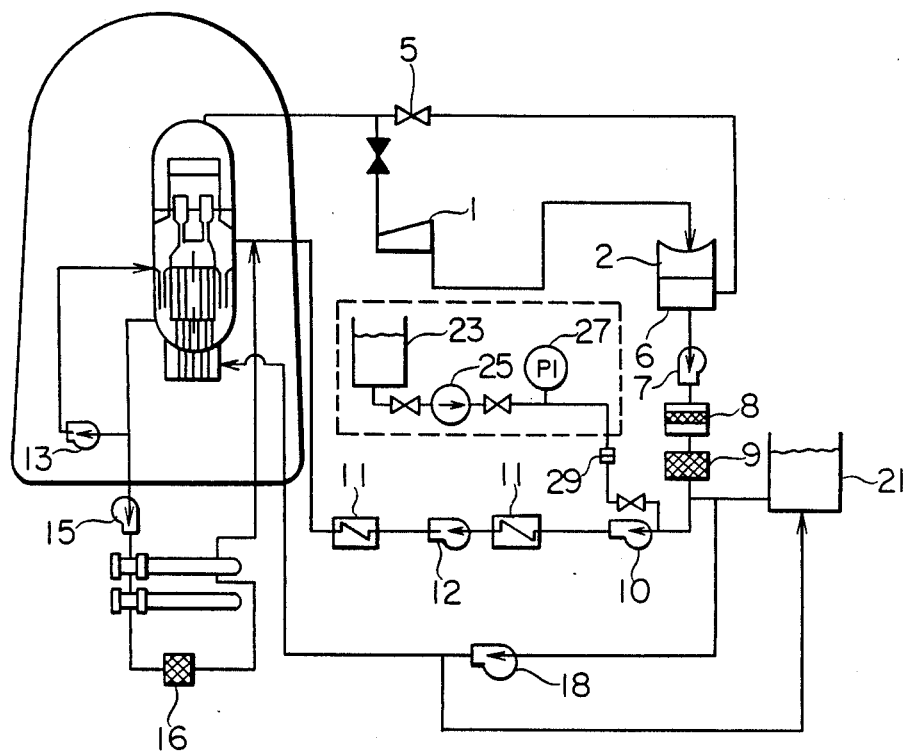
FIG. 7 is a flow diagram showing injection of alkaline elements into a feedwater-condensate water system of a nuclear power plant.

A third embodiment of the present invention will be shown in FIG. 7, where alkaline elements are injected into the feedwater-condensate water system. The alkaline element injection point to the feedwater-condensate water system is desirably at the inlet to the condensate water-pressurizing pump 10, where the system pressure is lower. The same unit for injecting alkaline elements as shown in FIG. 1 is provided at the inlet to the condensate water-pressurizing pump 10 to make intermittent or continuous injection.

Figure 8:
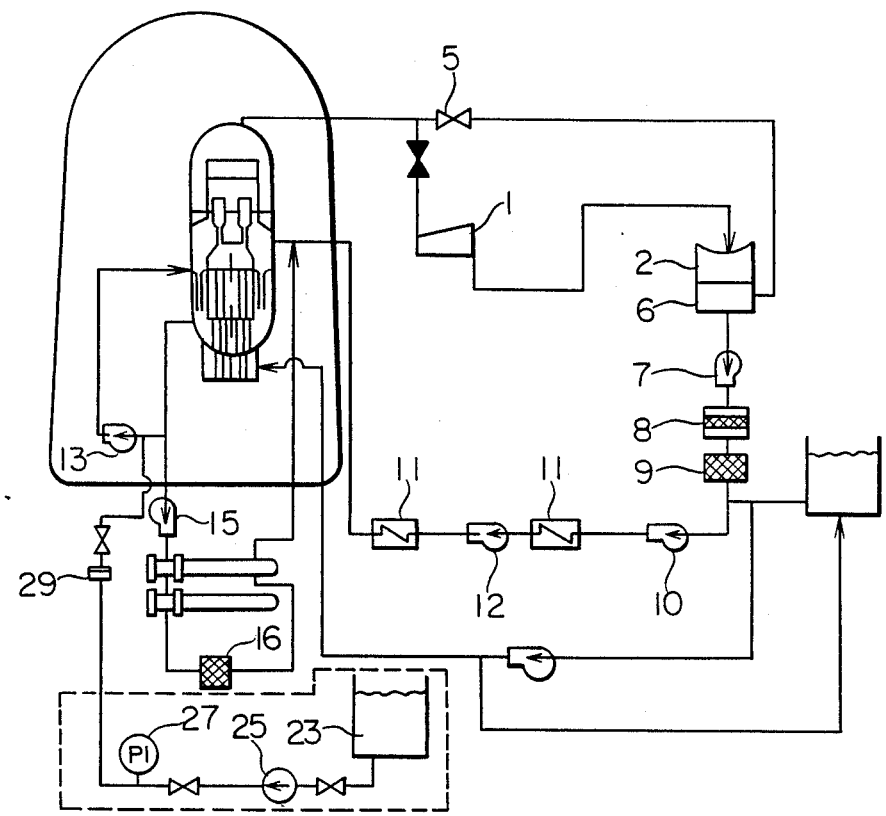
FIG. 8 is a flow diagram showing injection of alkaline elements into a primary loop recirculation (PLR) system of a nuclear power plant.

The fourth embodiment of the present invention will be shown in FIG. 8, where alkaline elements are injected into the PLR system. The alkaline element injection point to the PLR system is desirably at the inlet to the PLR pump 13. The alkaline element injection is carried out in the same manner as shown in FIG. 1 or FIG. 6.

Figure 9:
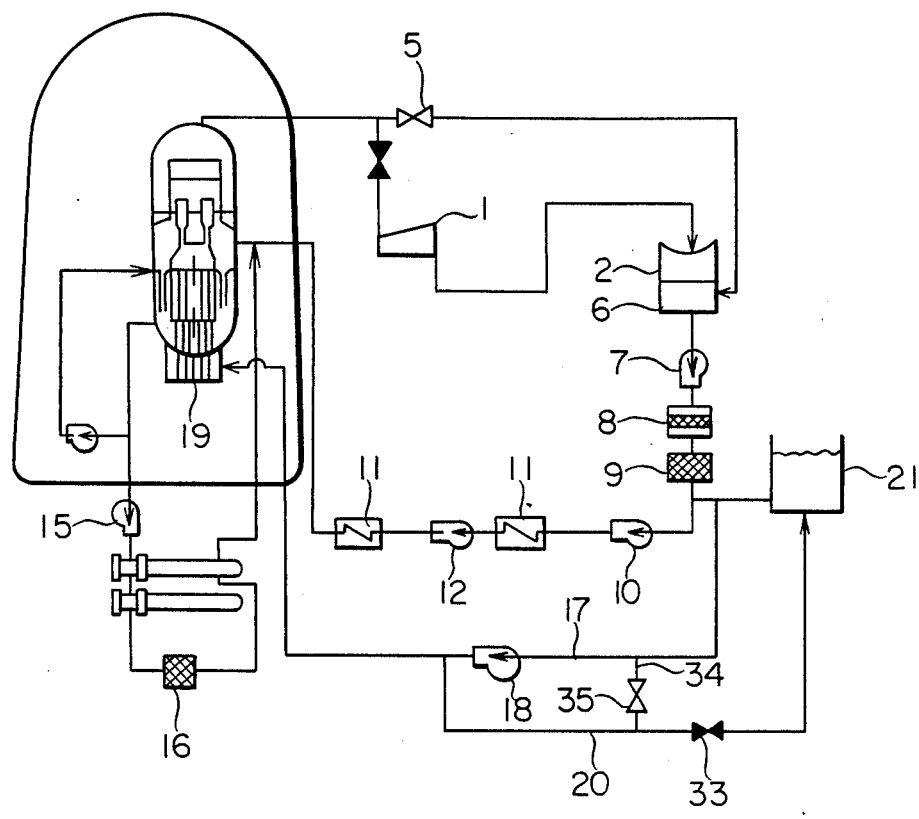
FIG. 9 is a flow diagram showing reactor water pH adjustment by loading an alkali element on the resins in a condensate demineralizer.

The fifth embodiment of the present invention will be shown in FIG. 9, where alkaline elements are loaded on the ion exchange resins in the condensate demineralizer 9 and released into the feedwater-condensate water. In this case, the alkaline elements can be injected at a predetermined concentration into the nuclear reactor while the feedwater-condensate water flows through the system. For example, in case of Na as the alkali element, about 4 ppb of Na can be released from the resin in the condensate demineralizer 9 when $[R-M]/[R-H]$ is adjusted to about 0.75 in the equation (2). Thus, the amount of the alkaline elements to be injected can be changed proportionally to the flow rate of feedwater. The amount of the Na injected into the nuclear reactor is balanced with the amount of the Na removed in the RWCU filter 16. In this case, it is not desirable to load the alkaline elements on the cation exchange resin in the mixed resins in the RWCU filter 16 at the same time, because the feedwater always flows through the nuclear reactor as the cooling water during the nuclear heatup operation period and it is always necessary to remove the alkaline elements in excess from the system. Furthermore, in this case a portion of the alkaline elements released from the resins in the condensate demineralizer 9 flows into the CRD system and further into the condensate storage tank 21. Thus, the same recycle loop as shown in FIG. 6 must be provided at the CRD system.

According to the present invention, a pretreatment to form an oxide film having a distinguished effect on suppressing deposition of radioactive substances can be readily and economically carried out in an actual nuclear power plant. It can be expected that the suppression of deposition of radioactive substances can be 30-50% increased in the present invention over that of the prior art.

Furthermore, to keep the radioactivity level of a nuclear power plant lower according to the present invention is also effective for the reduction to exposure of plant personnel to the radioactivity in the maintenance and inspection for prolonging the life of the plant.

What is claimed is:

1. A method for suppressing deposition of radioactive substances in a boiling water-type, nuclear power plant, which comprises injecting an alkaline element into reactor water to adjust the reactor water to a slightly alkaline condition in the presence of an amount of the oxygen formed by radiolysis of the reactor water and dissolved in the reactor water during the initial nuclear heatup operation period of the boiling water-type, nuclear power plant after the construction of the boiling water-type, nuclear power plant and circulating the reactor water containing the injected alkaline element through the primary cooling water system of a nuclear reactor in the boiling water-type, nuclear power plant, thereby forming an oxide film on the surfaces of out-of-core components of the primary cooling water system of the nuclear reactor.

2. A method according to claim 1, wherein the alkaline element is injected in the form of an aqueous solution into a reactor water cleanup system of the plant.

3. A method according to claim 1, wherein pH of the reactor water is adjusted to 7.8-8.6 by the injection of the alkaline element.

4. A method for suppressing deposition of radioactive substances in a boiling water-type, nuclear power plant, which comprises injecting an alkaline element into reactor water to adjust the reactor water to a slightly alkaline condition in the presence of an amount of the oxygen formed by radiolysis of the reactor water and dissolved in the reactor water without hydrogen injection during the initial nuclear heatup operation period of the boiling water-type, nuclear power plant after the construction of the boiling water-type, nuclear power plant and circulating the reactor water containing the injected alkaline element through the primary cooling water system of a nuclear reactor in the boiling water-type, nuclear power plant, thereby forming an oxide film on the surfaces of out-of-core components in the primary cooling water system of the nuclear reactor.

5. A method according to claim 4, wherein the alkaline element is injected in the form of an aqueous solution into a reactor water cleanup system of the plant.

6. A method according to claim 4, wherein pH of the reactor water is adjusted to 7.8-8.6 by the injection of the alkaline element.

* * * * *